(12) United States Patent
Watanabe

(10) Patent No.: US 9,120,282 B2
(45) Date of Patent: Sep. 1, 2015

(54) BUFFING APPARATUS FOR PRODUCTION OF RETREADED TIRE

(75) Inventor: Tetsuya Watanabe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 334 days.

(21) Appl. No.: 13/575,167

(22) PCT Filed: Dec. 20, 2010

(86) PCT No.: PCT/JP2010/072892

§ 371 (c)(1),
(2), (4) Date: Sep. 11, 2012

(87) PCT Pub. No.: WO2011/096141

PCT Pub. Date: Aug. 11, 2011

(65) Prior Publication Data

US 2013/0005226 A1    Jan. 3, 2013

(30) Foreign Application Priority Data

Feb. 2, 2010    (JP) .................................. 2010-021640

(51) Int. Cl.
*B24B 55/00* (2006.01)
*B29D 30/54* (2006.01)
*B24B 5/36* (2006.01)

(52) U.S. Cl.
CPC ................ *B29D 30/54* (2013.01); *B24B 5/366* (2013.01); *B29D 2030/541* (2013.01)

(58) Field of Classification Search
CPC ...... B24B 5/366; B24B 49/165; B24B 55/06; B29D 2030/0638; B29D 30/54; B29D 2030/541
USPC ............... 451/451–457, 21; 409/134; 15/53.4
See application file for complete search history.

(56) References Cited

U.S. PATENT DOCUMENTS 2,723,513 A * 11/1955 Slonneger ...................... 451/178
3,162,233 A    12/1964 Stull
(Continued)

FOREIGN PATENT DOCUMENTS

| EP | 0 531 953 A1 | 3/1993 |
| JP | B-44-5925 | 3/1969 |
| JP | A-2002-067031 | 3/2002 |
| JP | A-2008-126479 | 6/2008 |
| WO | WO 2009/002342 A1 | 12/2008 |
| WO | WO 2009/002344 A1 | 12/2008 |

OTHER PUBLICATIONS

Feb. 15, 2011 International Search Report issued in International Application No. PCT/JP2010/072892.
Sep. 18, 2012 International Preliminary Report on Patentability issued in International Application No. PCT/JP2010/072892.
May 22, 2013 Extended European Search Report issued in European Application No. 10845272.3.

*Primary Examiner* — Joseph J Hail
*Assistant Examiner* — Brian Keller
(74) *Attorney, Agent, or Firm* — Oliff PLC

(57) ABSTRACT

A buffing apparatus for production of a retreaded tire. The buffing apparatus can reliably prevent the scatter of buffing swarf and allows smooth transfer of the tire after the buffing operation. The buffing apparatus for production of a retreaded tire includes a grinder facing the tire and buffing its periphery, upper and lower scatter shields disposed about the grinder, spaced apart from each other in the tire radial direction, and coming in contact with the tire, and left and right scatter shields spaced apart from each other in the tire width (axial) direction and coming in contact with the tire. The left and right scatter shields are of such design as to be turnable from predetermined initial positions outward in the axial directions of the tire.

6 Claims, 7 Drawing Sheets

(56) References Cited

U.S. PATENT DOCUMENTS

| | | | |
|---|---|---|---|
| 3,675,706 A * | 7/1972 | Cahill | 157/13 |
| 3,879,788 A * | 4/1975 | Cousin | 15/42 |
| 3,882,644 A * | 5/1975 | Cusumano | 451/359 |
| 4,126,081 A * | 11/1978 | Zdeb | 409/134 |
| 4,736,546 A * | 4/1988 | Ugo | 451/254 |
| 5,279,076 A * | 1/1994 | Healy et al. | 451/456 |
| 5,411,433 A * | 5/1995 | Keller | 451/451 |
| 5,525,095 A * | 6/1996 | Baughman | 451/72 |

* cited by examiner

OUTWARD IN TIRE AXIAL DIRECTION | INWARD IN TIRE AXIAL DIRECTION | INWARD IN TIRE AXIAL DIRECTION | OUTWARD IN TIRE AXIAL DIRECTION

OUTWARD IN TIRE AXIAL DIRECTION | INWARD IN TIRE AXIAL DIRECTION | INWARD IN TIRE AXIAL DIRECTION | OUTWARD IN TIRE AXIAL DIRECTION

BUFFING APPARATUS FOR PRODUCTION OF RETREADED TIRE

TECHNICAL FIELD

The present invention relates to a buffing apparatus used in the production of a retreaded tire and, in particular, to a buffing apparatus for production of a retreaded tire capable of preventing the scatter of buffing swarf from the tire periphery in the buffing with a grinder.

BACKGROUND ART

In a conventionally known method for producing a retreaded tire, the outer periphery, or the tread area, of a used tire is buffed and a separately fabricated tread is affixed to the periphery (buffed surface) of the buffed tire by means of adhesive bonding or curing.

In this method, buffing is done with a buffing apparatus having a grinder capable of buffing the outer periphery of a tire. The used tire is rotatably held by a tire rotating unit, and the grinder is brought closer to the tire rotating unit until it comes in contact with the tire periphery. And the rotating grinder is moved in a relative motion along the tread width of the tire, thereby forming a buffed surface having predetermined curvatures ("buff line").

Also, the buffing operation produces buffing swarf. And cover members and brushes are used to keep the swarf inside the covers and prevent it from scattering outside the operation area. The cover members are provided behind and around the grinder and extend toward the tire. The brushes, which are turnably attached to the cover members, are brought into contact with the outer periphery, namely, the tread or shoulder area, of the tire.

PRIOR ART DOCUMENT

Patent Document

Patent Document 1: Japanese Unexamined Patent Application Publication No. 2008-126479

However, with such conventional antiscattering means consisting of cover members and brushes, the left and right brushes coming in contact with the shoulder regions of the tire are attached fixedly to the covers. As a result, there may be cases where the left or the right brush does not come in contact with the shoulder region of the tire if the tire to be buffed is of a small width. And this can create a problem of the buffing swarf scattering through the gaps between the left and right brushes and the shoulder regions of the tire.

Also, in some cases, the areas of the tire to be buffed by the grinder are not only the tread region, but can extend to the shoulder area and even to the neighborhood of the sidewall area. Therefore, when the grinder is moved in a relative motion to reach such positions, a problem of the scattering of buffing swarf can also occur because the left and right brushes may move apart from the shoulder area or the sidewall area.

Moreover, the cover members covering the neighborhood of the sidewalls or the brushes coming in contact with the shoulder areas are installed fixedly. Hence, when the tire after buffing is to be transferred to the next process of final polishing or the like, it is necessary to move back the tire or the grinder away from each other so that the tire may not touch the cover members or the left and right brushes during the transfer. This creates a problem of lowered efficiency of operation.

SUMMARY OF THE INVENTION

Problem to be Solved by the Invention

The present invention has been made to solve the foregoing problems, and an object thereof is to provide a buffing apparatus for production of a retreaded tire that can reliably prevent the scatter of buffing swarf from the buffing of tire periphery by creating no gap with the tire periphery regardless of the tire width and the movement of the grinder along the tire width and that also allows smooth transfer of the tire after the buffing operation.

Means for Solving the Problem

To solve the foregoing problems, in a first aspect of the present invention, a buffing apparatus for the production of a retreaded tire, which buffs the outer periphery of a rotating base tire, includes a grinder (grinding wheel) facing the tire and buffing its outer periphery, upper and lower scatter shields disposed about the grinder, spaced apart from each other in a tire radial direction, and coming in contact with the tire, and left and right scatter shields spaced apart from each other in a tire axial direction and coming in contact with the tire. In this buffing apparatus, the left and right scatter shields are of such design as to be turnable from predetermined initial positions outward in the axial directions of the tire.

According to this aspect of the invention, the left and right scatter shields can be turned outward in the axial directions of the tire. Therefore, the left and right scatter shields can be brought into contact with the tire whether the tire width is large or small.

Also, in a second aspect of the invention, the buffing apparatus is of such design that the initial positions of the left and right scatter shields are diagonal in the axially outward directions of the tire.

According to this aspect of the invention, the initial positions of the left and right scatter shields are diagonal in the axially outward directions of the tire. Therefore, even when the grinder is moved for the buffing of the outer periphery of a tire, the left and right scatter shields can be turned easily in contact with the periphery of the tire. Also, in the buffing of a tire of a large width, the left and right scatter shields can be turned by simply getting the tire closer to the grinder, thus easily achieving the contact of the left and right scatter shields with the outer periphery of the tire.

Also, in a third aspect of the invention, both the end portions of the upper and lower scatter shields project beyond the maximum opening edges of the left and right scatter shields having been turned to maximum extents.

According to this aspect of the invention, the upper and lower scatter shields, which are longer than the maximum opening of the left and right scatter shields, create a closed space jointly with the outer periphery of the tire and the left and right scatter shields, even when the left and right scatter shields are turned to maximum extents. As a result, the scattering of buffing swarf from the buffing of tire periphery can be prevented.

Also, in a fourth aspect of the invention, the upper and lower scatter shields are secured to the buffing apparatus.

According to this aspect of the invention, the upper and lower scatter shields secured to the buffing apparatus can maintain their contact with the outer periphery of the tire without dislocation even when a force from contact strong enough to pull them into the rotation of the tire works on them.

Also, in a fifth aspect of the invention, the left and right scatter shields have each an upper and a lower brush spaced apart from each other in a tire radial direction and a brush interconnecting the upper and lower brushes along an end portion thereof closer to the tire.

According to this aspect of the invention, even when the left or the right scatter shield comes in contact with the side area of the tire, the tire-side brush and the upper and lower brushes remain in contact with the side area of the tire, thereby maintaining a closed space between the outer periphery of the tire, the left and right scatter shields, and the upper and lower scatter shields. Hence, it is possible to prevent the scattering of the rubber swarf produced.

Also, in a sixth aspect of the invention, the hair projection length of the upper and lower brushes is progressively shorter from the tire side to the grinder side.

According to this aspect of the invention, the brush hairs on the grinder side are shorter than the brush hairs on the tire side. This will reduce the friction of the grinder-side brush with the tire periphery and thus prevent the readhesion of the rubber swarf due to the heating from the friction on the tire periphery.

Also, in a seventh aspect of the invention, the left and right scatter shields have each a bracket provided via a turning means around the grinder and the upper and lower brushes and the tire-side brush are respectively implanted to the upper and lower end portions of the brackets and to an end portion thereof on the tire side.

According to this aspect of the invention, the brushes of the left and right scatter shields are each formed in a U shape with the upper and lower brushes spaced apart from each other in a tire radial direction and the tire-side brush interconnecting the upper and lower brushes along an end portion thereof closer to the tire. Therefore, even when the left or the right scatter shield comes in contact with the sidewall area of the tire, a closed space is always created by the outer periphery of the tire, the upper and lower scatter shields, and the left and right scatter shields. Hence, it is possible to suction almost all of the rubber swarf produced.

Note that the "initial positions of the left and right scatter shields" as used herein refer to the original positions of the left and right scatter shields before they are turned outward in the axial directions of the tire in response to the approach of the tire.

Also, it is to be understood that the foregoing summary of the invention does not necessarily recite all the features essential to the invention, and subcombinations of all these features are intended to be included in the invention.

Hereinafter, the invention will be described based on preferred embodiments which do not intend to limit the scope of the claims of the present invention but exemplify the invention. All of the features and the combinations thereof described in the embodiments are not necessarily essential to the invention, and they include constructions and arrangements to be employed selectively.

BEST MODE FOR CARRYING OUT THE INVENTION

First Embodiment

Figure 1:
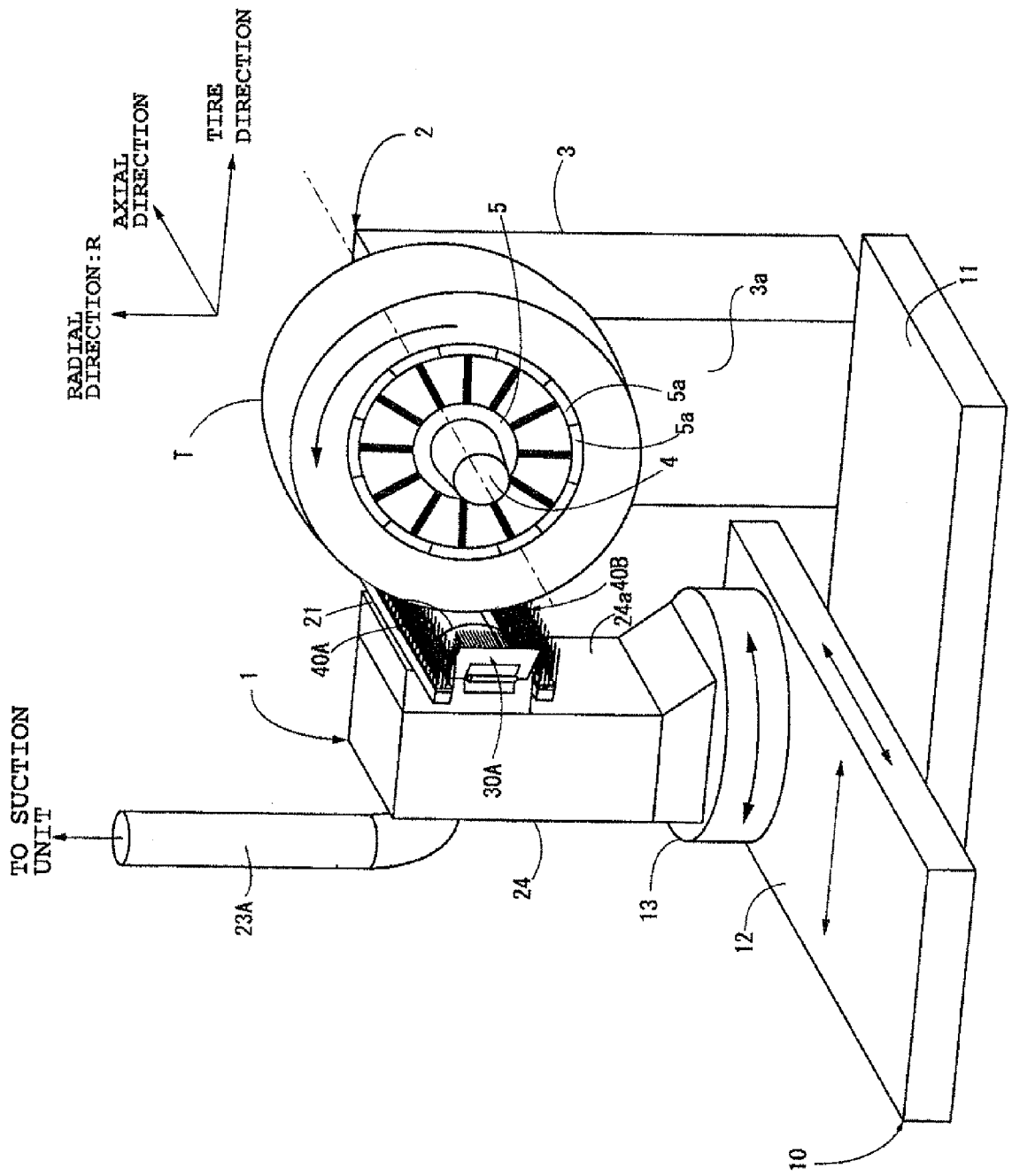
FIG. 1 is an overall schematic illustration of a buffing apparatus in accordance with the first embodiment of the present invention.
Figure 2A:
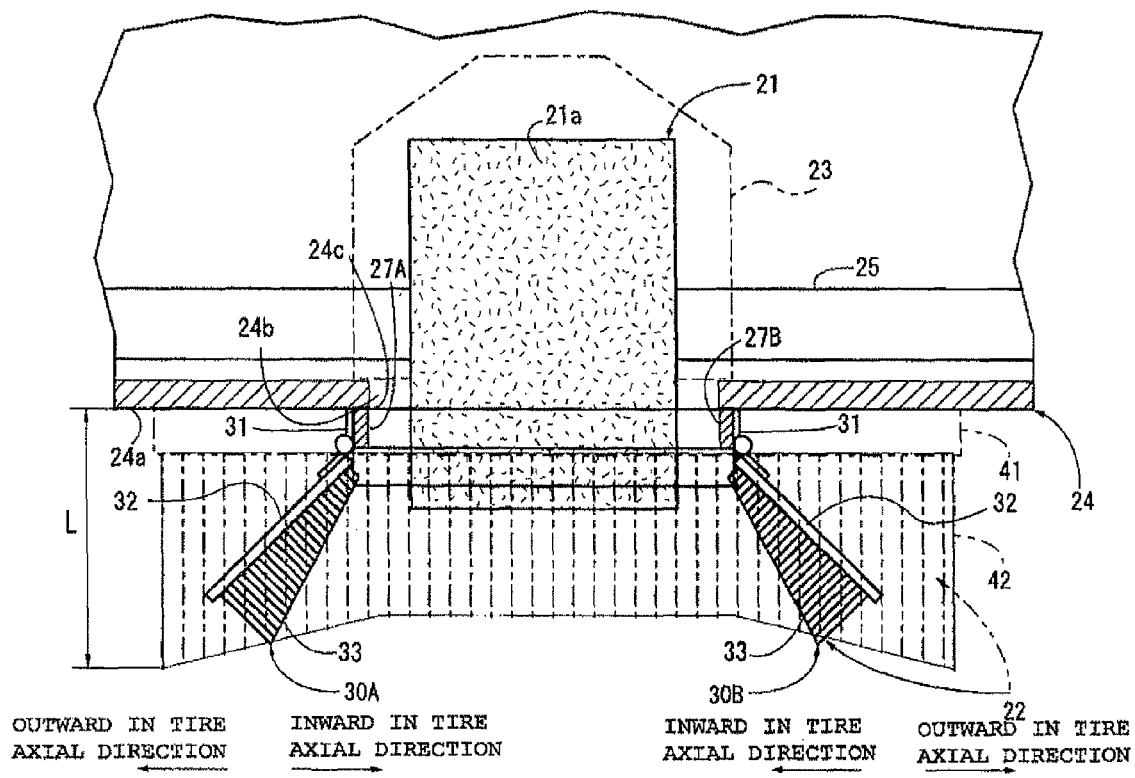
FIG. 2 is a plan view and an elevational view of the left and right scatter shields and upper and lower scatter shields when the left and right scatter shields are in their initial positions in accordance with the first embodiment of the present invention.
Figure 2B:
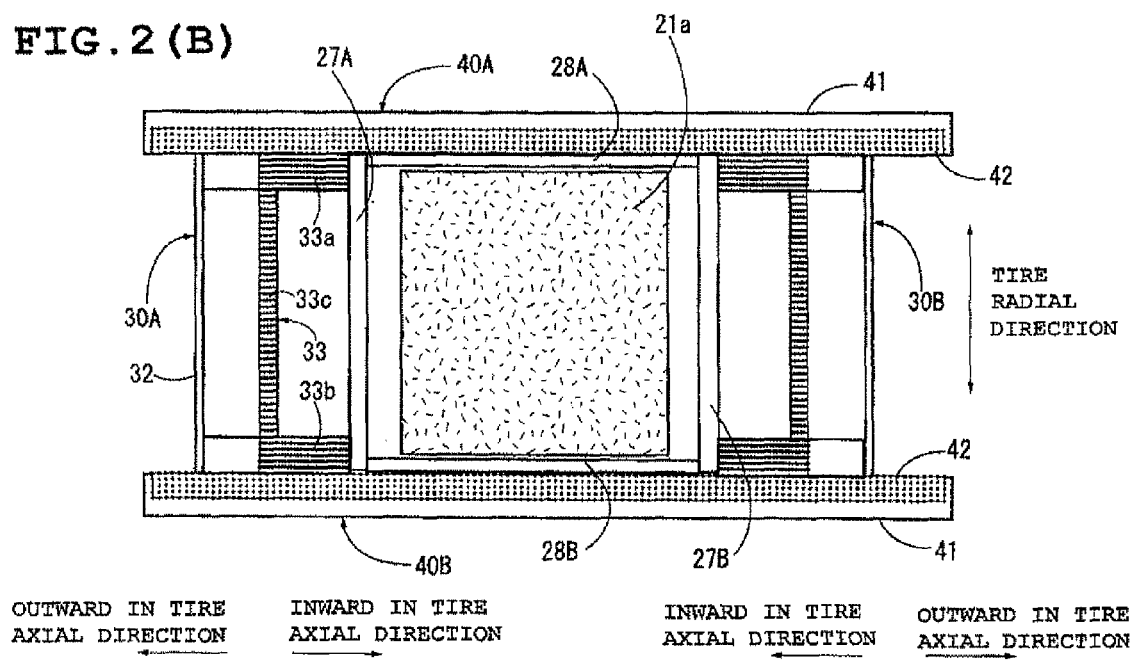
Figure 3A:
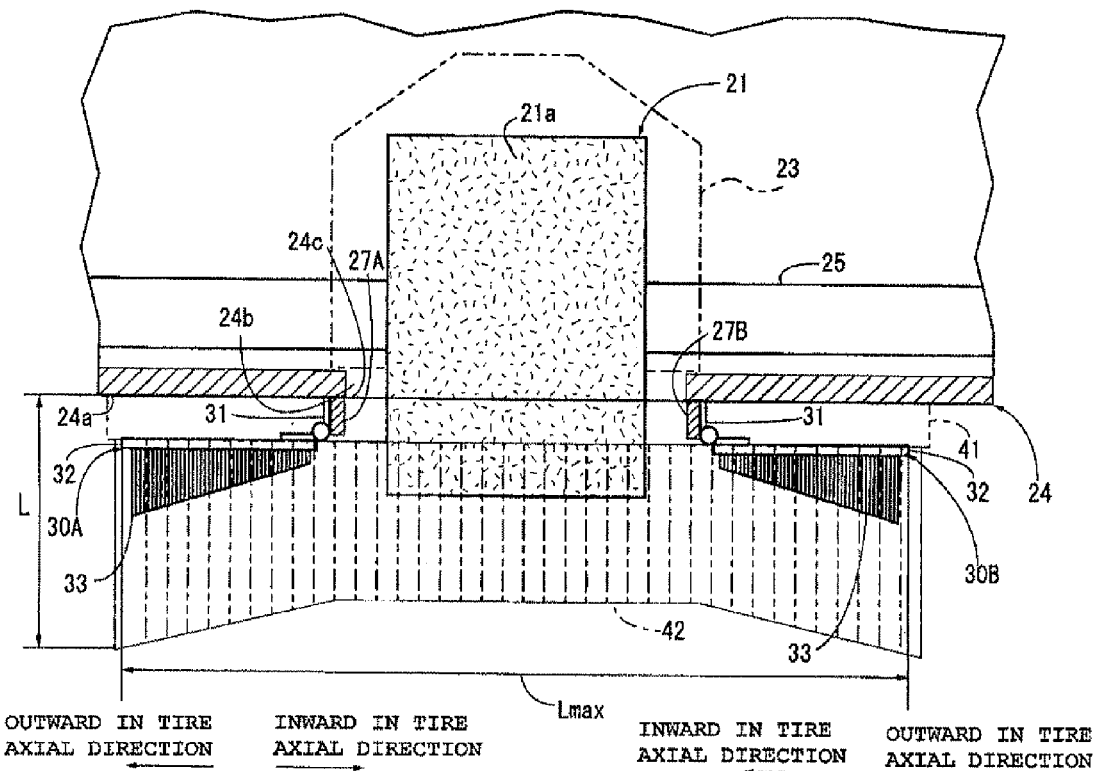
FIG. 3 is a plan view and an elevational view of the left and right scatter shields and the upper and lower scatter shields when the left and right scatter shields are turned to their maximum extent in accordance with the first embodiment of the present invention.
Figure 3B:
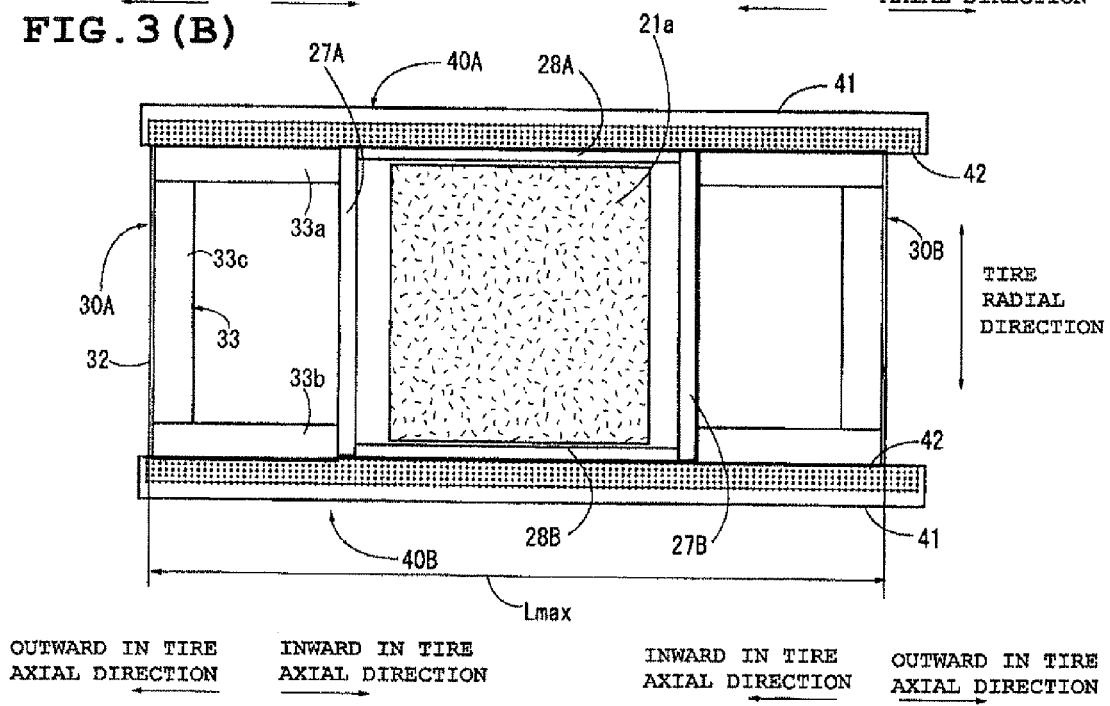

FIG. 1 is an overall schematic illustration of a buffing apparatus 1 according to the present invention. FIG. 2 is an elevational view and a plan view of left and right scatter shields in their initial positions and upper and lower scatter shields. FIG. 3 is an elevational view and a plan view of the left and right scatter shields and the upper and lower scatter shields when the left and right scatter shields have been turned to their maximum extent.

Hereinbelow, the buffing apparatus will be explained referring to FIGS. 1 to 3.

As shown in FIG. 1, the buffing apparatus 1 is installed in a position facing a tire rotating and holding unit 2 which holds a tire T rotatably.

The tire rotating and holding unit 2 is described first. The tire rotating and holding unit 2 is constructed of a not-shown rotating mechanism rotatably holding the tire T to be buffed, a body unit 3 having a holding mechanism therewithin, a rotating shaft 4 projecting from one side surface 3a of the body unit 3, and a drum 5 for holding the tire T.

The body unit 3 has therewithin a not-shown motor with an output shaft to which a pulley is attached and a not-shown compressor for supplying air into the tire. The rotating shaft 4 for rotating the tire T projects from the one side surface of the body unit 3. And a pulley is attached to the end of the rotating shaft 4 on the body unit 3 side, and the drum 5 for holding the tire T is secured to the projecting end of the rotating shaft 4.

The drum 5, constructed of a plurality of drum pieces 5a which are pieces radially divided from the center thereof, can expand or contract with the drum pieces 5a moving in the radial direction of the tire T. A belt-like seal ring formed into a cylinder is set about the outer periphery of the drum 5 in such a manner as to cover the drum pieces 5a. Therefore, when the tire T is held with the drum 5 radially expanded, the seal ring adhering tightly to the bead portions of the tire keeps the air having been supplied inside the tire T. The seal ring is provided with a not-shown valve for the supply of air into the tire T attached firmly thereto. The valve is connected to any one of the plurality of drum pieces 5a, and air is supplied into the tire T from the compressor through the valve.

The outer periphery of a tire T held by the tire rotating and holding unit 2 of a structure as described above is buffed into a predetermined shape by the buffing apparatus 1.

The buffing apparatus 1 is installed on a movable table 10 which is placed on the floor of a factory or such other facility building. The movable table 10 is constructed of an X-axis table 11 held by the tire rotating and holding unit 2 and extending in parallel with a radial direction of the tire T, a Y-axis table 12 placed on the X-axis table 11 and extending in parallel with an axial (width) direction of the tire T, and a rotary table 13 placed on the Y-axis table 12 and rotating within the horizontal surface of the Y-axis table 12. The Y-axis table 12 is movable on the X-axis table 11 in the extension direction and the width direction of the X-axis table 11. The buffing apparatus 1 is placed on the rotary table 13.

The buffing apparatus 1 includes a not-shown motor, a grinder (grinding wheel) 21, scatter shields 22, and a funnel 23 serving as a suction unit. As shown in FIG. 2, the grinder 21, which is disposed inside a housing 24 of the buffing apparatus 1, rotates driven by the rotating shaft 25 revolving by the rotative force of the not-shown motor connected thereto via a not-shown reduction mechanism. The shaft center of the rotating shaft 25 extends horizontally at the same height as the shaft center of the rotating shaft 4 of the tire rotating and holding unit 2.

As shown in FIG. 2, the grinder 21 has an outer periphery 21a of a cylindrical body covered with cutting or grinding teeth that come in contact with the outer periphery of the tire T and is rotatably secured onto the rotating shaft 25 which is inserted through the bore of the cylindrical body. Part of the outer periphery 21a of the grinder 21 is exposed from a rectangular opening 24b provided in one side surface 24a of the housing 24.

At the frame part 24c on the tire T side forming the opening 24b, the left and right covers 27A, 27B and the upper and lower covers 28A, 28B are provided to project toward the tire T in the form of a frame surrounding the opening 24b and the part of the grinder 21 exposed from the opening 24b. Anchored to the outer surfaces of the left and right covers 27A, 27B are left and right scatter shields 30A, 30B, respectively. In other words, the left and right scatter shields 30A, 30B are the members provided about the grinder 21 spaced apart from each other in the axial (width) direction of the tire T.

Anchored to the upper and lower covers 28A, 28B are upper and lower scatter shields 40A, 40B, respectively. In other words, the upper and lower scatter shields 40A, 40B are the members provided about the grinder 21 spaced apart from each other in the radial (R) direction of the tire T.

As described above, the left and right scatter shields 30A, 30B and the upper and lower scatter shields 40A, 40B are attached through the medium of the left and right covers 27A, 27B and the upper and lower covers 28A, 28B, respectively. The arrangement, however, may be such that they are directly mounted to the one side surface 24a where the opening 24b is formed.

The left and right scatter shields 30A, 30B are each comprised of a hinge 31, a bracket 32, and a brush set 33. It is to be noted that the left and right scatter shields 30A, 30B are such that they may be exchanged with each other for use.

The hinges 31, which are spring-loaded hinges, are attached to the outer surfaces of the left and right covers 27A, 27B. The hinges 31, which are turnable in the axially inward or outward direction of the tire T, are so attached that the biasing force of the springs works in the axially inward direction of the tire T.

Therefore, the brackets 32 to be discussed shortly which are turnably attached to the hinges 31 are under a biasing force in the axially inward direction of the tire T in the initial condition and can open in the axially outward direction of the tire T against the biasing force of the springs when the grinder 21 approaches the tire T and comes in contact with the outer periphery of the tire T.

The brackets 32 are each formed in a rectangular plate, the long side length being approximately equal to the height of the frame part 24c of the opening 24b and the short side length, namely, the projection length toward the tire T, set shorter than the projection length L of the upper and lower scatter shields 40A, 40B. One of the long side edges of the bracket 32 is secured to the hinge 31.

Also, a brush set 33 is implanted perpendicularly to the axially inner surface of each bracket 32 in a U shape.

The brush set 33 is constituted of upper and lower brushes 33a, 33b, which are continuously implanted along the short sides of the inner surface of the bracket 32, and a tire-side brush 33c, which is continuously implanted along a long-side end portion closer to the tire T of the inner surface of the bracket 32 in such a manner as to interconnect the upper and lower brushes 33a, 33b. In other words, the brush set 33 is a component member implanted along the upper and lower edges and the tire-side edge of the rectangular bracket 32, that is, along the three sides of the bracket 32 except for a single side closer to the grinder 21.

The hair projection length of the upper and lower brushes 33a, 33b of the brush set 33 is so set as to be progressively shorter from the tire T side to the grinder 21 side. This will reduce the occurrence of unnecessary friction between the buttress portions of the tire T and the upper and lower brushes 33a, 33b during the buffing, thereby extending the life of the upper and lower brushes 33a, 33b.

Also, the left and right scatter shields 30A, 30B of a structure as described above are secured to the hinges 31, 31 in such initial positions that they are open at positions diagonal in the axially outward directions of the tire T.

Thus, the left and right scatter shields 30A, 30B, under a biasing force of the springs when they are turned, can make certain that the brush sets 33 trace the outer peripheries of the tire T without leaving them.

The upper and lower scatter shields 40A, 40B are anchored to the upper and lower covers 28A, 28B, respectively, at the opening 24b along the extension direction of the rotating shaft 25 of the grinder 21.

The upper and lower scatter shields 40A, 40B are each constructed of a bracket 41 and a brush 42. The brackets 41, which are each a long member with a rectangular cross section, are fixed along the extension direction of the upper and lower covers 28A, 28B, that is, along the axial (width) direction of the tire T.

Also, as shown in FIG. 3, the extension length of the brackets 41 is longer than the maximum opening length Lmax of the left and right scatter shields 30A, 30B. And the brackets 41 are fixed in positions such that both ends thereof protrude axially outward from the edges of the opening.

Implanted on the surface of the bracket 41 facing the tire T is a brush 42 along the extension direction thereof. The brush 42 projects perpendicularly from the outer surface of the bracket 41 to a length greater than the length at which the tips of the hairs (bristles) of the brush 42 come in contact with the outer periphery of the tire T. More specifically, the length of the hairs of the brush 42 is to be set longer than the length at which the tips thereof come in contact with the outer periphery of the tire T and shorter than the length at which they do not get pulled into the rotating tire T.

In other words, the upper and lower scatter shields 40A, 40B are located above and below the left and right scatter shields 30A, 30B, respectively. As such, the brushes 42 are always overlapping the upper and lower brushes 33a, 33b of the left and right scatter shields 30A, 30B, thus covering the upper and lower brushes 33a, 33b.

Installed on the grinder 21 side of the opening 24b is a funnel 23 that covers the entirety of the grinder. The wider opening side of the funnel 23 is secured to the back side of the one side surface 24a, and a suction duct 23A is connected to the narrower opening side of the funnel 23. That is, the buffing swarf produced by the grinder 21 is recovered in a not-shown suction unit through the suction duct 23A.

The buffing apparatus 1 and tire rotating and holding unit 2 of a structure described above are coupled to a not-shown controller. The controller includes a touch-panel type input unit, a storage unit, and a control unit, for instance.

The storage unit stores "buff lines" for the buffing of the periphery of tire T relative to the structure, dimensions, and other information for the product numbers of tires to be buffed and outputs to the control unit the buffing shape based on the tire information inputted from the touch panel. The control unit outputs an expansion signal to the drum 5 of the tire rotating and holding unit 2 to hold the tire T and an air supply signal to the compressor to supply air for the internal pressure into the tire T. Also, the control unit outputs a moving signal to the movable table to locate the buffing apparatus 1 in a predetermined position, a buffing signal to move the grinder 21 of the buffing apparatus 1 in such a manner as to buff the outer periphery of the tire T into a predetermined shape, and a rotation signal to the not-shown motor to rotate the grinder 21. Also, the control unit outputs a tire rotation signal to the not-shown motor to rotate the drum 5 of the tire rotating and holding unit 2.

According to the arrangement as described above, the left and right brackets 32 constituting the left and right scatter shields 30A, 30B are turnably secured to the spring-loaded hinges 31 at the opening 24b. Therefore, even when the buffing apparatus 1 is moved in the buffing of the tire T in such a manner as to turn the outer periphery thereof into a predetermined "buff line", the brush sets 33 on the left and right scatter shields 30A, 30B trace the surfaces of the tire T under the biasing forces of the hinges 31 of the left and right scatter shields 30A, 30B. As a result, no gap will be created between the tire T and the left and right scatter shields 30A, 30B.

Hereinbelow, the buffing of the outer periphery of a tire T by a buffing apparatus 1 of a structure as described above will be explained.

First the operator places a tire T to be buffed on the drum 5 of the tire rotating and holding unit 2. Then the operator inputs the product number, size, and such other information on the tire T placed on the drum 5 through the touch panel. Next, based on the information, the controller outputs a tire holding signal to an expansion means for the drum 5 to have the drum pieces 5a constituting the drum 5 expand radially to hold the bead portions of the tire T under predetermined pressure. Then the controller outputs an air supply signal to the compressor to supply air for a predetermined internal pressure in the tire T.

Next, the controller outputs a moving signal to the movable table 10, on which the buffing apparatus 1 is mounted, to move the buffing apparatus 1 to a position where the grinder 21 of the buffing apparatus 1 faces the outer periphery of the tire T and then have the grinder 21 come in contact with the outer periphery of the tire T. At this time, the arrangement should be such that the axial (width) center of the grinder 21 is brought into contact with the axial (width) center of the tire T with the rotating shaft 25 of the grinder 21 in parallel with the rotating shaft 4 of the tire T.

Next, the controller outputs a buffing signal to the movable table 10 to obtain a "buff line" matching the product number of the tire T. In response to this signal, the movable table 10 moves the grinder 21 outward in the tire T axial direction and in a direction approaching the tire T, the grinder 21 is rotated, and the position of the buffing apparatus 1 is controlled such that the outer periphery of the tire T is turned into a shape having predetermined curvatures.

Figure 4:
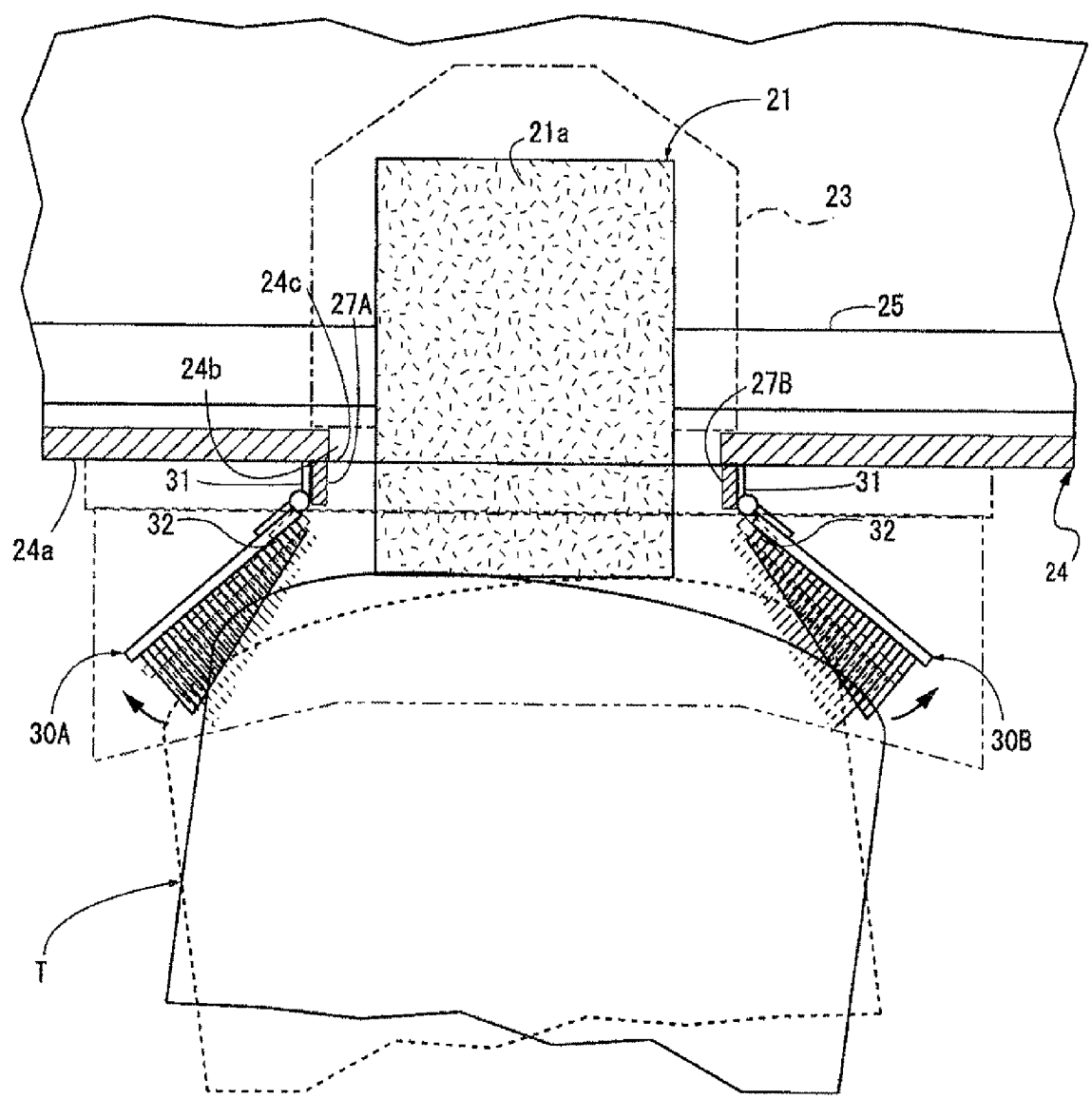
FIG. 4 is an illustration of a buffing operation in accordance with the first embodiment of the present invention.

For example, as shown by a solid line in FIG. 4, when the outer periphery of the tire T on the side further from the tire rotating and holding unit 2 is buffed by the buffing apparatus 1, the left scatter shield 30A, of the left and right scatter shields 30A, 30B, is turned outward in the axial direction of the tire T pushed by the outer periphery of the tire T whereas the right scatter shield 30B is turned under the biasing force of the spring of the hinge 31 while remaining in contact with the outer periphery of the tire T. Also, as shown by a broken line in FIG. 4, when the outer periphery of the tire T on the side closer to the tire rotating and holding unit 2 is buffed by the buffing apparatus 1, the left scatter shield 30A, of the left and right scatter shields 30A, 30B, is turned under the biasing force of the spring of the hinge 31 while maintaining the contact of the brush set 33 with the outer periphery of the tire T whereas the right scatter shield 30B is turned outward in the axial direction of the tire T pushed by the outer periphery of the tire T.

As such, the buffing can be performed without any gap created between the tire T and the left and right scatter shields 30A, 30B. And the buffing swarf produced by the buffing does not scatter outside the area enclosed by the tire T and the brush sets 33 and is instead sucked through the suction duct 23A of the buffing apparatus 1 and recovered in a buffing swarf bin of the suction unit.

Hereinbelow, a description will be given of the advantageous effects of the buffing apparatus 1 equipped with the scatter shields of the present invention.

The scatter amounts of buffing swarf were compared between a buffing apparatus provided with conventional scatter shield units and a buffing apparatus 1 provided with the left and right scatter shields 30A, 30B and the upper and lower scatter shields 40A, 40B of the present invention, both placed within a not-hermetically-sealed antiscattering fence enclosing a predetermined are.

For comparative evaluation, the scatter amounts of rubber swarf from the buffing to a cutting depth of 1 mm of a used truck tire of "11R22.5" tire size were used.

Note that the scatter amount as used herein is the measured weight of recovered rubber swarf having scattered outside the antiscattering fence. Also, to ensure the accuracy of evaluation, the weight of the tire T was measured before and after the buffing, and the difference in weight was used as the total buffing weight. Then the weight of rubber swarf recovered from outside the antiscattering fence was divided by the total buffing weight. In other words, comparison was made on the basis of the scatter amount per unit weight.

As a result, the scatter rate of the buffing swarf outside the antiscattering fence by the buffing with the conventional buffing apparatus was 0.079%, whereas the scatter rate of the buffing swarf outside the antiscattering fence by the buffing with the buffing apparatus 1 of the present invention was 0.018%. This showed a reduction of 83% in the scatter amount of rubber swarf scattering outside the antiscattering fence.

Thus, it has been demonstrated that the left and right scatter shields 30A, 30B and the upper and lower scatter shields 40A, 40B according to the present invention can substantially reduce the scatter amount of buffing swarf from buffing. And this contributes to the improvement of the working environment for the buffing operators and the raised efficiency in the recovery of resources.

Second Embodiment

Figure 5:
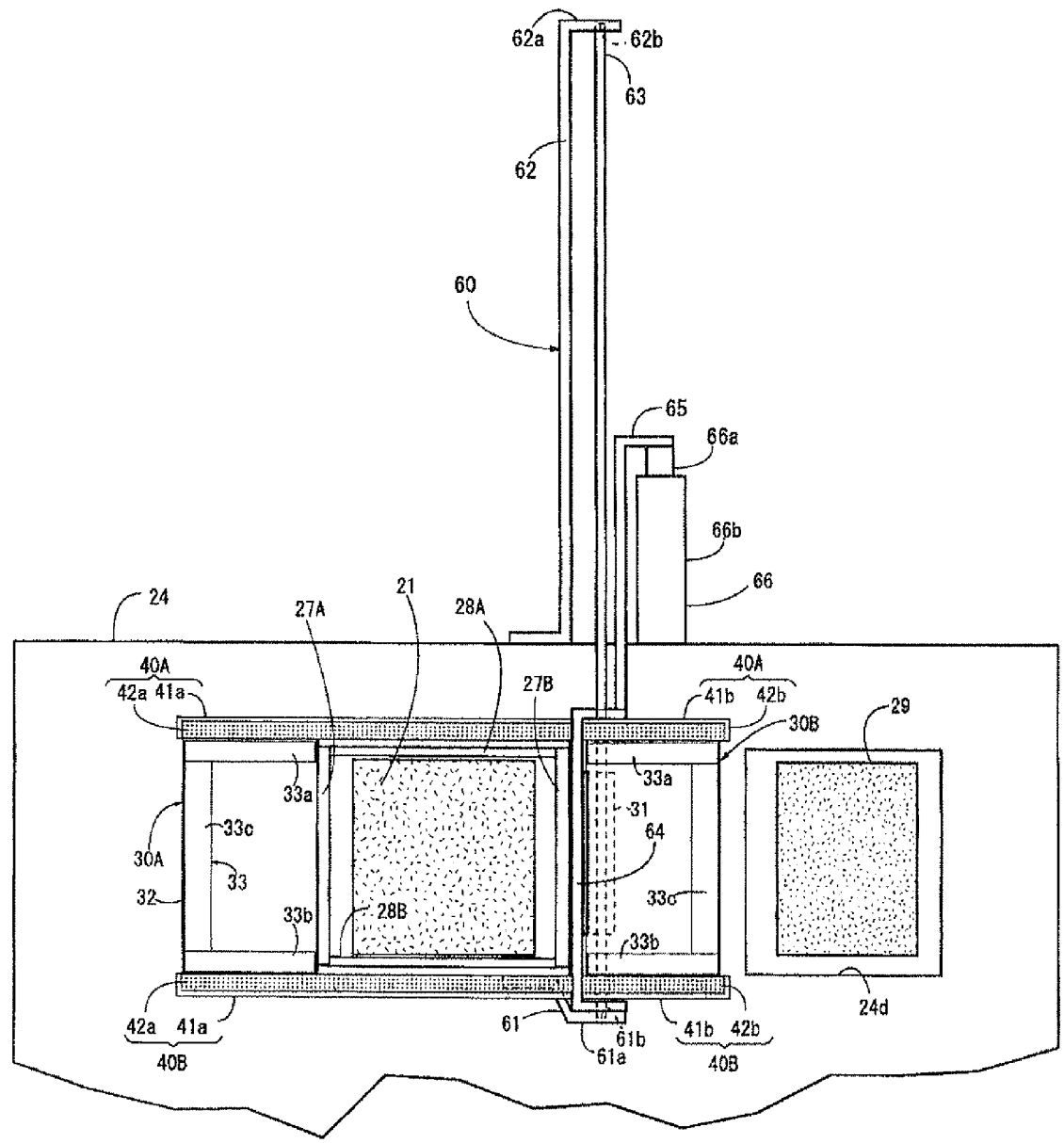
FIG. 5 is a partial configuration diagram of a buffing apparatus in accordance with the second embodiment of the present invention.
Figure 6:
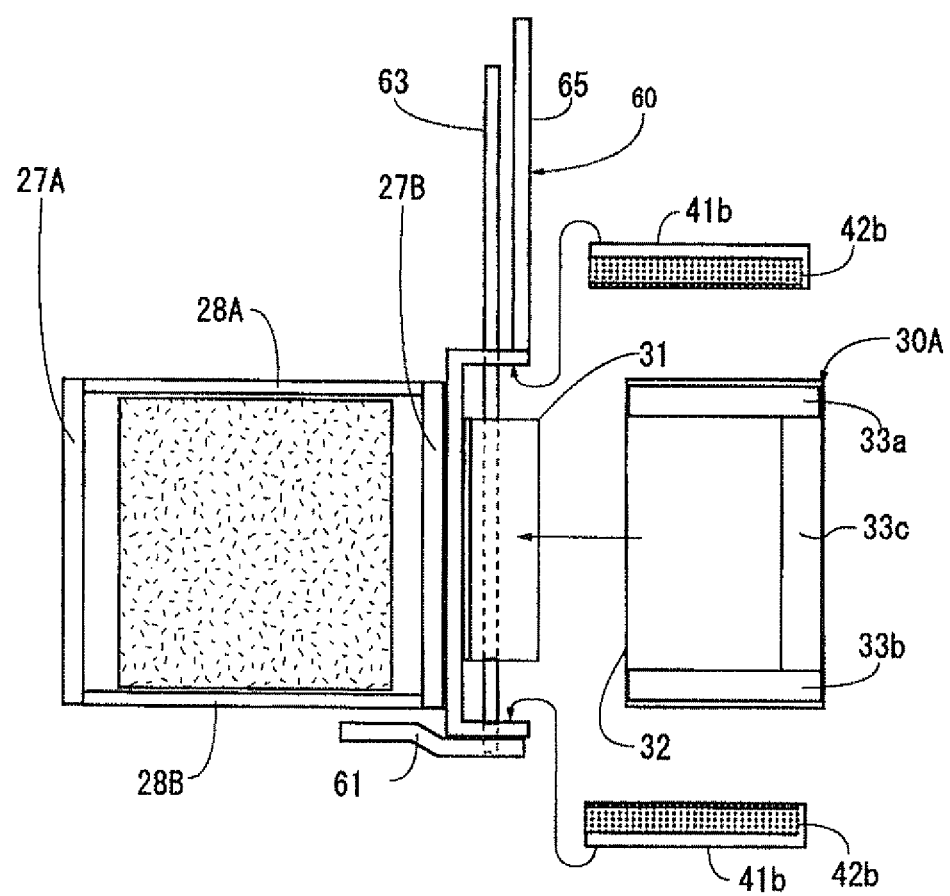
FIG. 6 is a partial configuration diagram of a buffing apparatus in accordance with the second embodiment of the present invention.

FIG. 5 is a partial configuration diagram of a buffing apparatus according to a second embodiment of the present invention. FIG. 6 is an exploded view of the partial configuration diagram shown in FIG. 5.

Although the description for the first embodiment has been of the case where there is only one grinder (grinding wheel) 21 for buffing the outer periphery of the tire T, the description for the second embodiment will be of the case where there is a finishing grinder (grinding wheel) 29 in addition to the grinder 21 of the first embodiment as shown in FIG. 5. Note, however, that the description of the parts having the same functions as those of the first embodiment will be omitted.

The finishing grinder 29, which is disposed on the same rotating shaft 25 of the grinder 21, is located on the right side as seen from the tire T.

That is, formed in the one side surface 24a of the buffing apparatus 1 are an opening 24b through which part of the outer periphery 21a of the grinder 21 protrudes and an opening 24d, a predetermined distance away from the opening 24b, through which part of the outer periphery of the finishing grinder protrudes.

The opening 24d for the finishing grinder 29 is not provided with the upper and lower and the left and right covers projecting toward the tire. Therefore, the buffing position of the finishing grinder 29 is recessed from the buffing position of the grinder 21 toward the rotating shaft 25.

In the case of the buffing apparatus 1 having the above-mentioned structure, the tire T buffed by the grinder 21 is put to a finishing by the finishing grinder 29. Therefore, in order to prevent the interference between the grinder and the right scatter shield 30B, of the left and right scatter shields 30A, 30B of the grinder 21, which is located on the finishing grinder 29 side, the left and right scatter shields 30A, 30B and the upper and lower scatter shields 40A, 40B according to the present embodiment of the invention are arranged as follows.

The parts of the upper and lower scatter shields 40A, 40B extending toward the right scatter shield 30B from the right cover 27B are separated. That is, the upper and lower scatter shields 40A, 40B are each divided into two parts, namely, a bracket 41a and a brush 42a on the grinder 21 side and a bracket 41b and a brush 42b on the finishing grinder 29 side, with the position of the right cover 27B as the boundary, for instance. The brackets 41a of the upper and lower scatter shields 40A, 40B on the grinder 21 side are fixed to the upper and lower covers 28A, 28B in the same way as for the first embodiment, and the parts thereof on the finishing grinder 29 side are fixed to a lifting and lowering mechanism 60 to be discussed shortly.

Also, the left scatter shield 30A of the left and right scatter shields 30A, 30B is fixed to the left covers 27A as in the first embodiment, and the right scatter shield 30B located on the finishing grinder 29 side is fixed to the lifting and lowering mechanism 60 to be discussed shortly.

The lifting and lowering mechanism 60 is constructed of a lower stay 61, an upper stay 62, a guide shaft 63, a moving body 64, an actuating shaft 65, and an air cylinder 66, which further consists of a cylinder 66a secured to the top surface of the housing of the buffing apparatus 1 and a piston 66b extending and contracting along the extension direction of the guide shaft 63, an end of the piston 66b connected to an end of the actuating shaft 65.

The lower stay 61 has a holding section 61a extending along the rotating shaft 25 of the grinder 21 from the lower cover 28b at the opening 24b and projecting from the right cover 27B. And the holding section 61a is provided with a hole 61b for holding an end the guide shaft 63 to be discussed later.

The upper stay 62, which extends upward from the top surface of the housing of the buffing apparatus 1, has a holding section 62a for holding the guide shaft 63 paired with the holding section 61a of the lower stay 61. And the holding section 62a is provided with a hole 62b for holding the other end the guide shaft 63 to be discussed later.

The guide shaft 63 is a cylindrical rod-like member supported by the lower stay 61 and the upper stay 62.

The moving body 64 consists of a flat plate part formed longer than the length of the opening 24b and bent portions facing each other at both ends of the flat plate part. The bent portions have each a hole through which the guide shaft 63 is inserted. The right scatter shield 30B is attached to the flat plate of the moving body 64, and part of the upper and lower scatter shields is attached to each of the bent portions thereof. More specifically, one side of the hinge 31 turning around the axis in the extension direction of the moving body 64 is secured to the bent-portion side face of the moving body 64, and the other side of the hinge 31 is secured to the bracket 32 of the right scatter shield 30B. Also, the brackets 41b and the brushes 42b of the upper and lower scatter shields 40A, 40B are secured to the inner sides of the bent portions, respectively.

The actuating shaft 65 extends upward in parallel with the guide shaft 63. One end of the actuating shaft 65 is secured to the upper bent portion of the moving body 64 having the guide shaft 63 inserted therethrough, and the other end thereof is secured to the piston of the air cylinder 66.

The air cylinder 66 is of such structure that the cylinder 66a is secured to the top surface of the housing of the buffing apparatus 1 and the piston 66b extends and contracts along the extension direction of the guide shaft 63, with an end of the piston 66b connected to an end of the actuating shaft 65.

Figure 7:
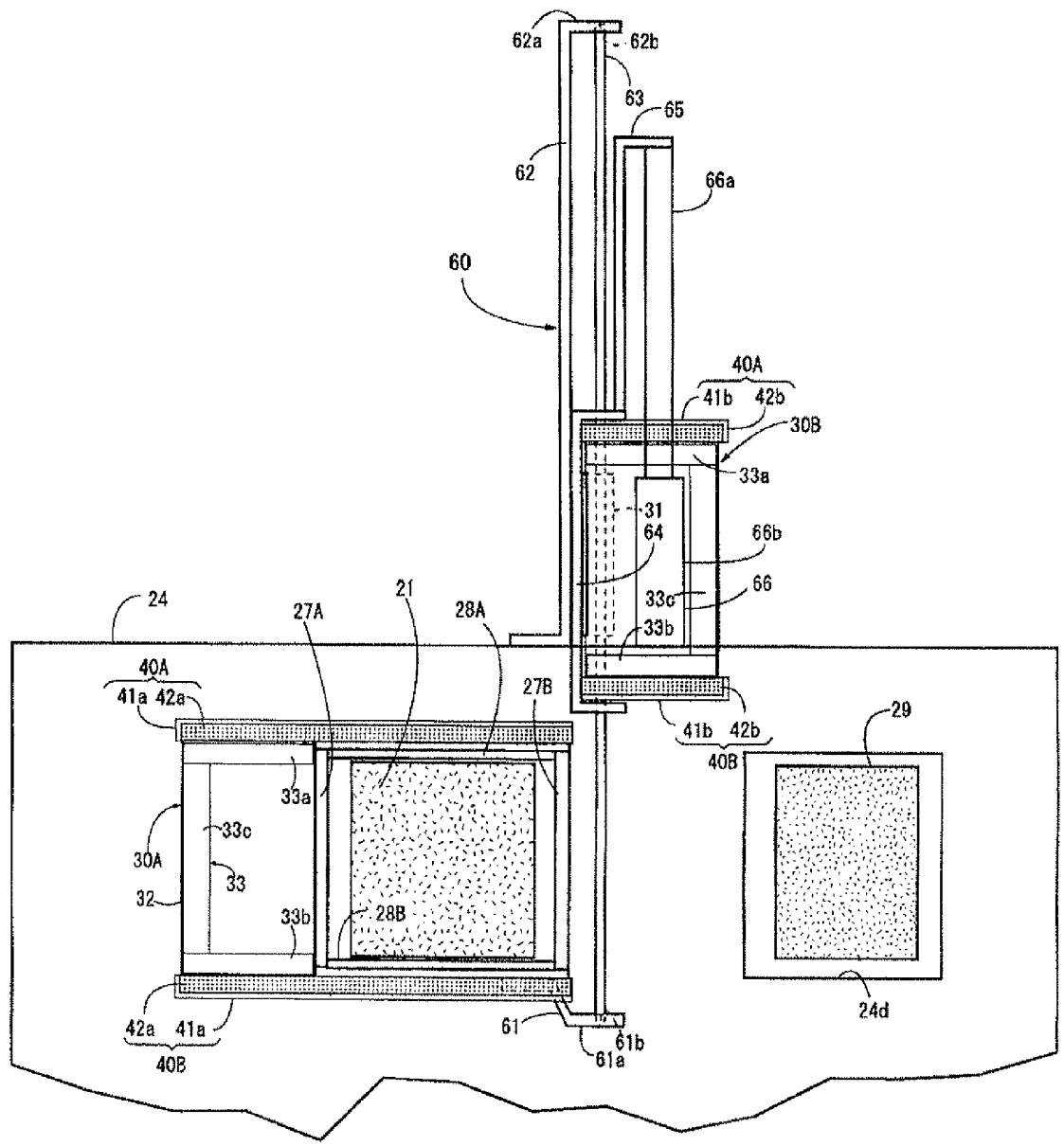
FIG. 7 is an operation diagram of a lifting and lowering mechanism of a buffing apparatus in accordance with the second embodiment of the present invention.

With a buffing apparatus 1 having a structure as described above, the buffing is first performed with the grinder 21 in the same way as for the first embodiment. Then, as shown in FIG. 7, the right scatter shield 30B and the brackets 41b and the brushes 42b of the upper and lower scatter shields 40A, 40B are moved above the opening 24d together with the moving body 64 by the extension of the piston 66b of the air cylinder 66 and the accompanying action of the actuating shaft 65.

Next, the outer periphery of the tire T is moved laterally until it faces the finishing grinder 29, and now it is possible to subject the buffed periphery of the tire to a finishing operation.

Hence, with a buffing apparatus implementing a structure as described above, a series of buffing operations can be performed without the interference of the left and right scatter shields 30A, 30B and the upper and lower scatter shields 40A, 40B with the tire T throughout the shift from the buffing with the grinder 21 to the buffing with the finishing grinder 29. Therefore, this buffing apparatus not only provides the advantageous effects of the first embodiment, but also raises the efficiency of the buffing operation.

Thus, as explained above, the buffing apparatus, provided with the upper and lower scatter shields and the left and right scatter shields according to the present invention, allows the turning of the left and right scatter shields during the buffing of tire periphery. Accordingly, the contact of the left and right scatter shields with the outer periphery of the tire is constantly maintained, thereby reducing the scatter amount of rubber swarf.

Also, the brushes of the left and right scatter shields are each formed in a U shape with the upper and lower brushes spaced apart from each other in a tire radial direction and the tire-side brush interconnecting the upper and lower brushes along an end portion thereof closer to the tire. Therefore, even when the left or the right scatter shield comes in contact with the sidewall area of the tire, a closed space is always created by the outer periphery of the tire, the upper and lower scatter shields, and the left and right scatter shields. Hence, it is possible to suction almost all of the rubber swarf produced. Also, the arrangement is such that the hair projection length of the upper and lower brushes on the left and right scatter shields is progressively shorter from the tire side to the grinder side. Thus, the grinder-side brushes are prevented from causing excessive friction with the tire periphery. This will reduce the heating of the tire periphery due to friction and prevent the readhesion of the rubber swarf due to the heating.

In the above embodiments, the hair projection length of the upper and lower brushes on the left and right scatter shields is progressively shorter from the tire side to the grinder side. However, the arrangement may be such that the hair projection length of the brushes is set as appropriate according to the desired buff line for the buffing of the tire. For example, the hair projection length of the upper and lower brushes may be set constant.

DESCRIPTION OF REFERENCE NUMERALS 1 buffing apparatus
2 tire rotating and holding unit
3 body unit
3a one side surface
4 rotating shaft
5 drum
5a drum piece
10 movable table
11 X-axis table
12 Y-axis table
13 rotary table
21 grinder (grinding wheel)
21a outer periphery
22 scatter shield
23 funnel
24 housing
24a one side surface
24b opening
24c frame part
24d opening
25 rotating shaft
27A, 27B left and right covers
28A, 28B upper and lower covers
29 finishing grinder (grinding wheel)
30A, 30B left and right scatter shields
31 hinge
32 bracket
33 brush set
33a, 33b upper and lower brushes
33c tire-side brush
40A, 40B upper and lower scatter shields
41, 41a, 41b bracket
42, 42a, 42b brush
60 lifting and lowering mechanism
61 lower stay
61a, 62a holding section
61b, 62b hole
62 upper stay
63 guide shaft
64 moving body
65 actuating shaft
66 air cylinder
66a cylinder
66b piston
Lmax maximum opening length
R radial direction
T tire

The invention claimed is:

1. A buffing apparatus for production of a retreaded tire by buffing an outer periphery of a rotating base tire, the buffing apparatus comprising:
   a grinder facing the tire and buffing outer periphery thereof;
   upper and lower scatter shields disposed about the grinder, spaced apart from each other in a vertical direction, and coming in contact with the tire; and
   left and right scatter shields spaced apart from each other in a tire axial direction and coming in contact with the tire,
   wherein each of the left and right scatter shields comprises a bracket provided via a turning means about the grinder and are pivotable from predetermined initial positions outward in axial directions of the tire, and
   wherein both end portions of the upper and lower scatter shields project beyond the maximum opening edges of the left and right scatter shields having turned to maximum extents.

2. The buffing apparatus for production of a retreaded tire as recited in claim 1, wherein the initial positions of the left and right scatter shields are diagonal in axially outward directions of the tire.

3. The buffing apparatus for production of a retreaded tire as recited in claim 1, wherein the upper and lower scatter shields are secured to the buffing apparatus.

4. The buffing apparatus for production of a retreaded tire as recited in claim 1, wherein the left and right scatter shields have each an upper and a lower brush spaced apart from each other in a vertical direction and a brush interconnecting the upper and lower brushes along an end portion thereof closer to the tire.

5. The buffing apparatus for production of a retreaded tire as recited in claim 4, wherein the hair projection length of the upper and lower brushes is progressively shorter from the tire side to the grinder side.

6. The buffing apparatus for production of a retreaded tire as recited in claim 4, wherein the tire-side brush is implanted to the upper and lower end portions of the brackets and in an end portion thereof closer to the tire.

* * * * *